(12) United States Patent
Lee et al.

(10) Patent No.: US 7,176,657 B2
(45) Date of Patent: Feb. 13, 2007

(54) CAPACITOR CHARGING CIRCUIT WITH A SOFT-START FUNCTION

(75) Inventors: Rong-Chin Lee, Ping-Tung County (TW); Ching-Kun Lin, Hsin-Chu (TW); Ching-Sung Wu, Hsin-Chu County (TW)

(73) Assignee: Aimtron Technology Corp., Hsinchu (TW)

( * ) Notice: Subject to any disclaimer, the term of this patent is extended or adjusted under 35 U.S.C. 154(b) by 325 days.

(21) Appl. No.: 10/710,997

(22) Filed: Aug. 16, 2004

(65) Prior Publication Data

US 2006/0033477 A1    Feb. 16, 2006

(51) Int. Cl.
*H01M 10/46* (2006.01)

(52) U.S. Cl. .................................................. 320/166

(58) Field of Classification Search ............... 320/166, 320/167
See application file for complete search history.

(56) References Cited

U.S. PATENT DOCUMENTS

| | | | |
|---|---|---|---|
| 6,411,064 B1 | 6/2002 | Brink | |
| 6,417,649 B1 | 7/2002 | Brink | |
| 6,518,733 B1 | 2/2003 | Schenkel et al. | |
| 6,597,221 B2* | 7/2003 | Hall et al. | 327/175 |
| 6,636,021 B2 | 10/2003 | Schenkel et al. | |
| 6,683,442 B1* | 1/2004 | Ferencz et al. | 323/274 |
| 2004/0130359 A1 | 7/2004 | Tzeng et al. | |

* cited by examiner

*Primary Examiner*—Edward H. Tso
(74) *Attorney, Agent, or Firm*—Winston Hsu

(57) ABSTRACT

When a primary winding current increases to an upper limit determined by a reference voltage having a soft-start characteristic, a power switch is turned OFF. When a secondary winding current decreases to a lower limit determined by another predetermined reference voltage, the power switch is turned ON. A minimum ON-time limiting unit prevents the power switch from being turned OFF before a minimum ON-time expires. The minimum ON-time may be provided with a soft-start modulation. A minimum OFF-time limiting unit prevents the power switch from being turned ON before a minimum OFF-time expires. A maximum ON-time limiting unit prevents the power switch from still remaining ON after a maximum ON-time expires.

17 Claims, 9 Drawing Sheets

CAPACITOR CHARGING CIRCUIT WITH A SOFT-START FUNCTION

BACKGROUND OF INVENTION

1. Field of the Invention

The present invention relates to a charging circuit and, more particularly, to a capacitor charging circuit with a soft-start function, applicable to effectively charge photoflash capacitors of digital still cameras or other capacitive loads over a wide voltage range.

2. Description of the Related Art

In photoflash systems of digital still cameras, a battery voltage source of approximately 3 volts is supplied to charge a photoflash capacitor through a transformer for raising the capacitor voltage from zero to several hundreds volts required for the excitation of a photoflash lamp. U.S. Pat. No. 6,411,064, U.S. Pat. No. 6,417,649, U.S. Pat. No. 6,518,733, and U.S. Pat. No. 6,636,021, all incorporated herein by reference, have already disclosed a variety of capacitor charging methods and circuits for charging capacitive loads such as photoflash capacitors over a wide voltage range. However, several problems are encountered in the prior art charging circuits and still need to be cured with further improvements and innovations.

At first, during an initial period of a charging process, a large amount of inrush current flows into a primary winding of the transformer, resulting in a significantly large amount of energy to be stored in the transformer. However, it takes an extremely long time for delivering the stored energy to the capacitive load through a secondary winding of the transformer since the terminal voltage across the capacitive load is almost zero at that time. As a result, the charging process is adversely affected by a very low efficiency during the initial period.

Each time when the power switch coupled to the primary winding performs ON/OFF switching operations, both of the primary winding current and the secondary winding current inevitably fluctuate up and down with a great proportion to their DC mean values. Because the primary and secondary winding currents are detected in order to determine the ON/OFF timing of the power switch, such fluctuant noise that casts an incredulous shadow over the current detecting results may destroy the control mechanism of the charging circuit.

After continuously supplying energy in the photoflash system for a long time, the battery voltage source may be subjected to a significant drop. The lower the battery voltage, the longer the primary winding current increases to a predetermined upper limit which controls the ON-to-OFF switching operation of the power switch. Consequently, each charging cycle is prolonged, resulting in large output ripples and low charging efficiency.

SUMMARY OF INVENTION

In view of the above-mentioned problems, an object of the present invention is to provide a capacitor charging circuit capable of reducing the inrush current and enhancing the charging efficiency during the initial period of the charging process.

Another object of the present invention is to provide a capacitor charging circuit capable of preventing the ON/OFF switching operations from being erroneously triggered by the fluctuant noise.

Still another object of the present invention is to provide a capacitor charging circuit capable of preventing the charging process from being deteriorated by the drop of the battery voltage.

According to one aspect of the present invention, a capacitor charging circuit is provided for controlling a transformer such that a voltage source coupled to a primary winding of the transformer charges a capacitive load coupled to a secondary winding of the transformer.

The capacitor charging circuit includes a power switch, a switch controller, and a soft-start circuit. The power switch is coupled to the primary winding of the transformer such that a primary winding current is allowed to flow during an ON-time of the power switch but is terminated during an OFF-time of the power switch. The switch controller is adopted to control the ON-time and the OFF-time of the power switch. During an initial period of a charging process, the soft-start circuit modulates the ON-time to gradually increase. Therefore, the capacitor charging circuit according to the present invention effectively reduces the inrush current and enhances the charging efficiency during the initial period of the charging process.

A first current detector is adopted to detect the primary winding current for generating a primary current detection signal. A reference voltage generator is controlled by the soft-start circuit for generating a soft-start reference voltage. A first voltage comparator is adopted to compare the primary current detection signal with the soft-start reference voltage so as to output an ON-time ending signal to the switch controller. A second current detector is adopted to detect a secondary winding current for generating a secondary current detection signal. A second voltage comparator is adopted to compare the secondary current detection signal with a predetermined reference voltage so as to output an OFF-time ending signal to the switch controller.

A minimum ON-time limiting unit is coupled to the switch controller or the first voltage comparator for preventing the power switch from being turned off before a minimum ON-time expires. Preferably, the minimum ON-time limiting unit is controlled by the soft-start circuit for modulating the minimum ON-time to gradually increase during the initial period of the charging process. A minimum OFF-time limiting unit is coupled to the switch controller or the second voltage comparator for preventing the power switch from being turned on before a minimum OFF-time expires. Therefore, the capacitor charging circuit according to the present invention effectively prevents the ON/OFF switching operations of the power switch from being erroneously triggered by the fluctuant noise of the winding currents.

A maximum ON-time limiting unit is coupled to the switch controller for preventing the power switch from still remaining ON after a maximum ON-time expires. Therefore, the capacitor charging circuit effectively prevents the charging process from being deteriorated by the drop of the battery voltage.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1:
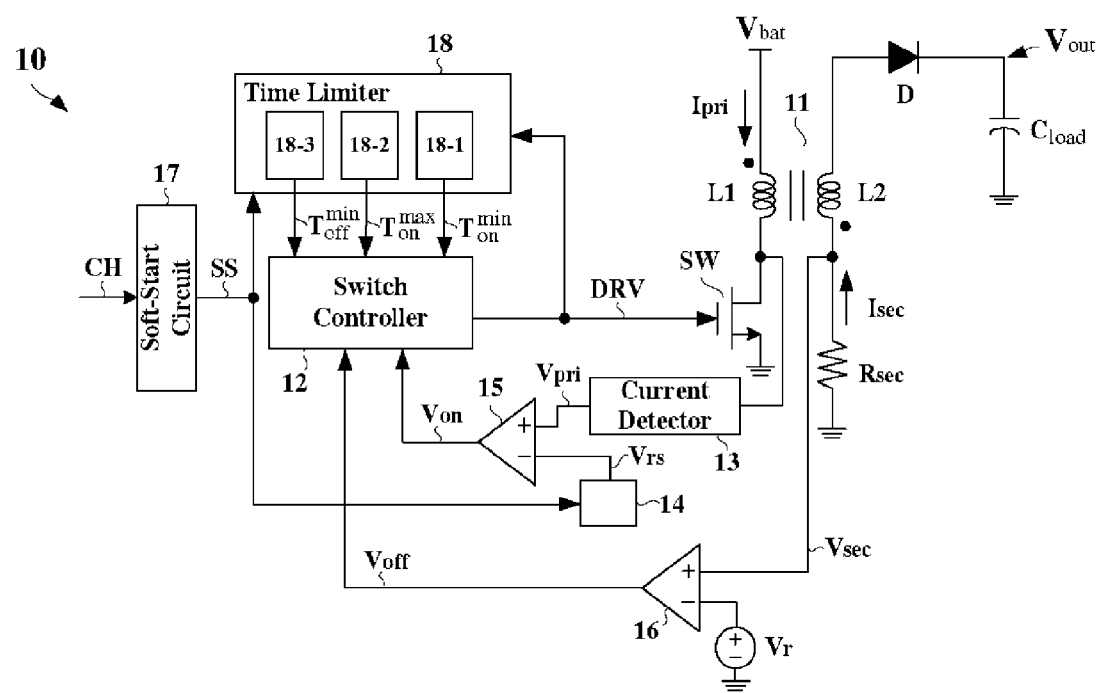
FIG. 1 is a circuit block diagram showing a capacitor charging circuit according to a first embodiment of the present invention.
Figure 2A:
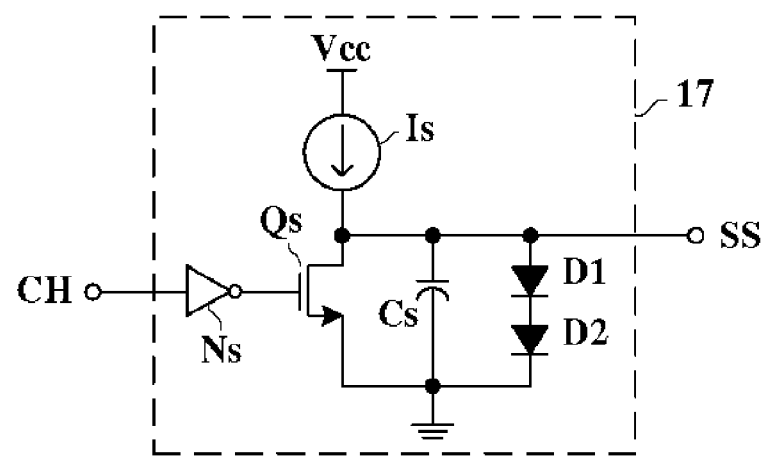
FIG. 2(a) is a detailed circuit diagram showing an example of a soft-start circuit according to a first embodiment of the present invention.
Figure 2B:
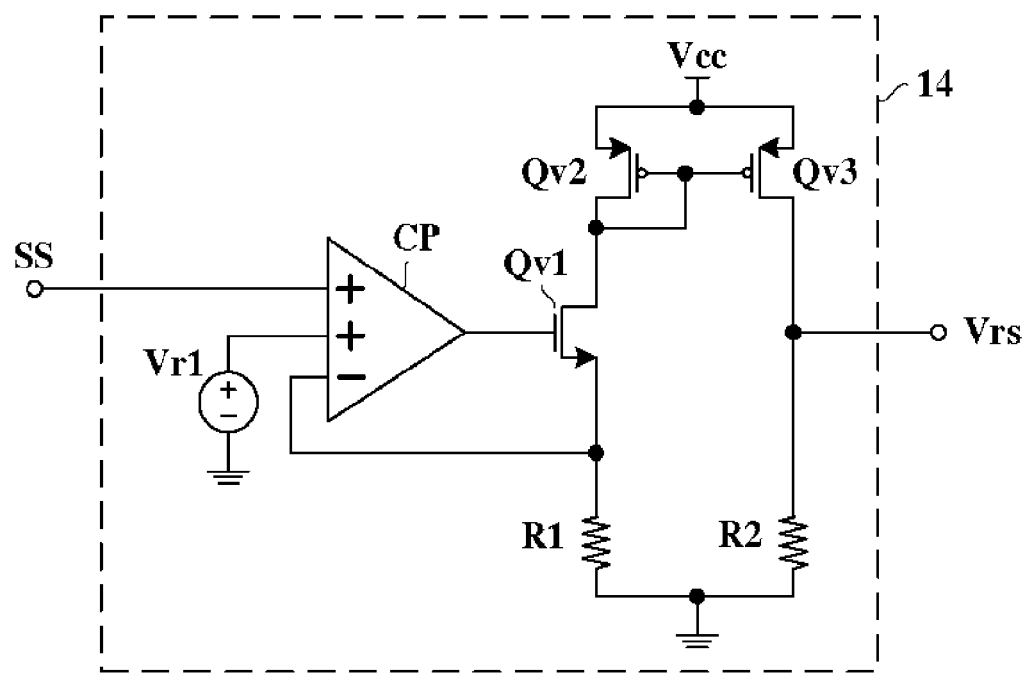
FIG. 2(b) is a detailed circuit diagram showing an example of a reference voltage generator according to a first embodiment of the present invention.
Figure 2C:
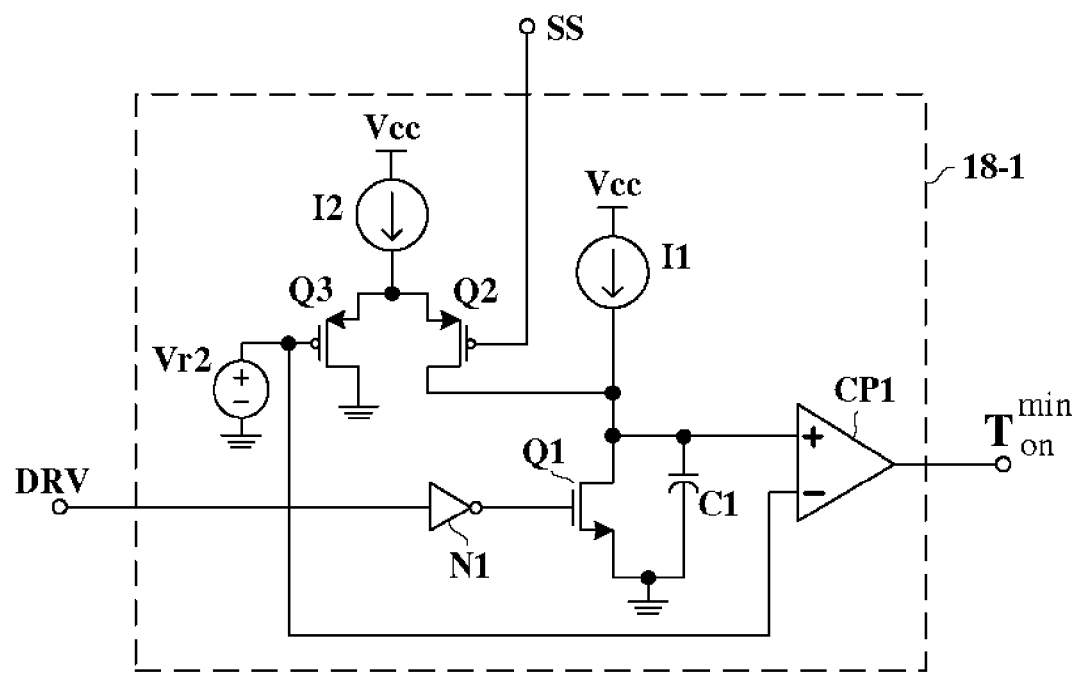
FIG. 2(c) is a detailed circuit diagram showing an example of a minimum ON-time limiting unit according to a first embodiment of the present invention.
Figure 2D:
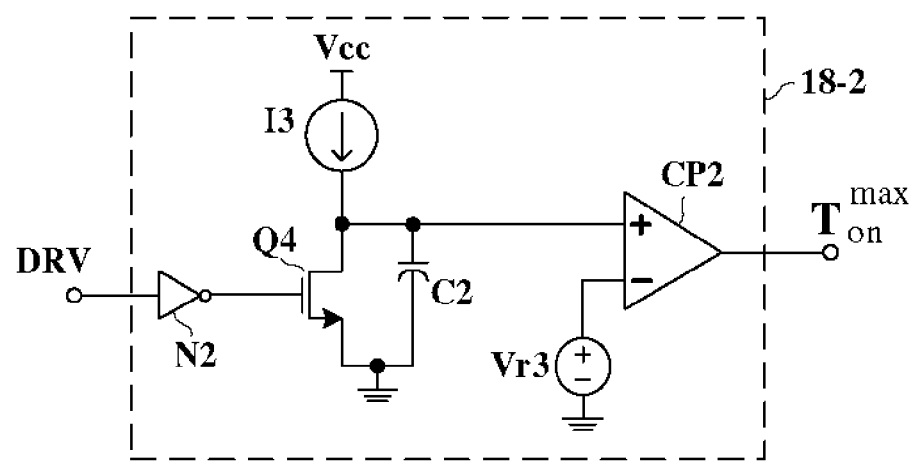
FIG. 2(d) is a detailed circuit diagram showing an example of a maximum ON-time limiting unit according to a first embodiment of the present invention.
Figure 2E:
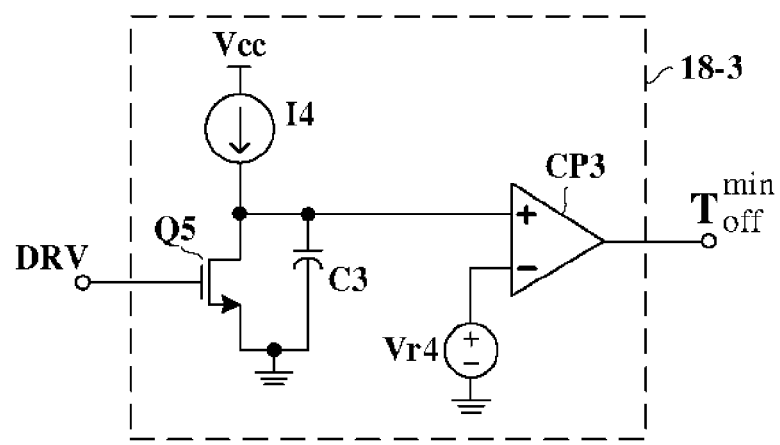
FIG. 2(e) is a detailed circuit diagram showing an example of a minimum OFF-time limiting unit according to a first embodiment of the present invention.
Figure 2F:
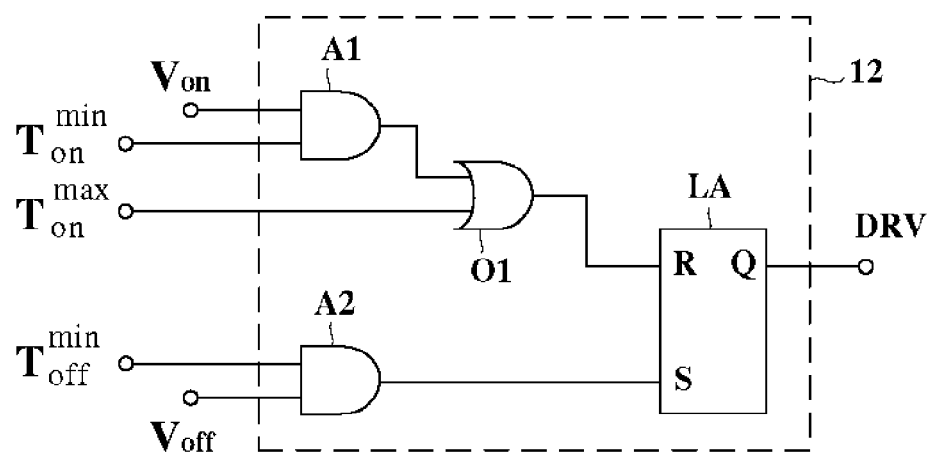
FIG. 2(f) is a detailed circuit diagram showing an example of a switch controller according to a first embodiment of the present invention.

FIG. 1 is a circuit block diagram showing a capacitor charging circuit 10 according to a first embodiment of the present invention. Referring to FIG. 1, under the ON/OFF switching operations of a power switch SW, a battery voltage $V_{bat}$ is regulated to provide an output voltage for charging a capacitive load $C_{load}$. In one embodiment of the present invention, the power switch SW may be implemented by an NMOS transistor manufactured in a high voltage semiconductor process. A primary winding L1 and a secondary winding L2 are arranged to have opposite polarities, as indicated by black dots in FIG. 1, and therefore the transformer 11 belongs to a flyback type. When the power switch SW is at the ON state, the battery voltage $V_{bat}$ supplies a primary winding current $I_{pri}$ to store energy in the transformer 11. Meanwhile, a secondary winding current $I_{sec}$ is zero and the terminal voltage $V_{out}$ across the capacitive load $C_{load}$ remains unchanged. When the power switch SW is at the OFF state, the battery voltage $V_{bat}$ stops supplying the primary winding current $I_{pri}$. Meanwhile, the energy stored in the transformer 11 is delivered to the capacitive load $C_{load}$ through the secondary winding current $I_{sec}$, causing the terminal voltage $V_{out}$ to increase. Arranged between the secondary winding L2 and the capacitive load $C_{load}$, a diode D is adopted to allow the secondary current $I_{sec}$ to charge the capacitive load $C_{load}$ and prevent the capacitive load $C_{load}$ from backwardly discharging to the secondary winding L2.

Based on the variations of the primary and secondary winding currents $I_{pri}$ and $I_{sec}$, a switch controller 12 generates a switch control signal DRV for determining the ON/OFF switching operations of the power switch SW. More specifically, a current detector 13 is adopted to detect the primary winding current $I_{pri}$ for generating a primary current detection signal $V_{pri}$. The primary current detection signal $V_{pri}$ is coupled to a non-inverting input terminal of a voltage comparator 15. A reference voltage generator 14 outputs a soft-start reference voltage $V_{rs}$ to an inverting input terminal of the voltage comparator 15. When the power switch SW is at the ON state, the battery voltage $V_{bat}$ delivers energy to the transformer 11, causing the primary current detection signal $V_{pri}$ to gradually increase from zero. Once the primary current detection signal $V_{pri}$ reaches the soft-start reference voltage $V_{rs}$, an ON-time ending signal $V_{on}$ generated by the voltage comparator 15 makes a transition from LOW to HIGH and then triggers the switch controller 12 to finish the ON-time and begin the OFF-time of the power switch SW. As a result, the primary winding current $I_{pri}$ is terminated to become zero. Based on the back electromotive force of the inductive windings, the secondary winding current $I_{sec}$ jumps from zero to a value determined by the primary winding current $I_{pri}$ immediately before terminated and the winding ratio L2/L1.

During the OFF-time of the power switch SW, the secondary winding current $I_{sec}$ charges the capacitive load $C_{load}$ and therefore continuously decreases. A secondary current detection signal $V_{sec}$ is generated by a series-connected resistor $R_{sec}$ through detecting the secondary winding current $I_{sec}$. The secondary current detection signal $V_{sec}$ is coupled to a non-inverting input terminal of a voltage comparator 16 while a predetermined reference voltage $V_r$ is coupled to an inverting input terminal of the voltage comparator 16. Once the secondary current $I_{sec}$ becomes low enough for causing the voltage comparator 16 to generate a HIGH level of an OFF-time ending signal $V_{off}$, the switch controller 12 is triggered to finish the OFF-time and begin the ON-time of the power switch SW. As a result, the secondary winding current $I_{sec}$ is terminated to become zero. Based on the back electromotive force of the inductive windings, the primary winding current $I_{pri}$ jumps from zero to a value determined by the secondary winding current $I_{sec}$ immediately before terminated and the winding ratio L1/L2. The charging cycle described above is continuously repeated for raising the terminal voltage $V_{out}$ across the capacitive load $C_{load}$ to several hundreds volts.

In one embodiment of the present invention, the current detector 13 may be implemented by a series-connected resistor. In another embodiment of the present invention, the current detector 13 may be implemented according to the disclosure of the US Patent Publication No. 2004-0130359, entitled "Current Sensing Circuit And Method Of A High-Speed Driving Stage," filed by the Assignee, and published on Jul. 8, 2004, which is incorporated herein by reference.

The capacitor charging circuit 10 is further provided with a soft-start circuit 17 and a time limiter 18 for enhancing the charging efficiency. In response to a charge command signal CH, the soft-start circuit 17 outputs a soft-start signal SS to the reference voltage generator 14 and the time limiter 18. In response to the soft-start signal SS, the reference voltage generator 14 outputs the soft-start reference voltage $V_{rs}$ to the voltage comparator 15. In response to the soft-start signal SS and the switch control signal DRV, the time limiter 18 outputs a minimum ON-time limiting signal $T_{on}^{min}$, a maximum ON-time limiting signal $T_{on}^{max}$, and a minimum OFF-time limiting signal $T_{off}^{min}$ to the switch controller 12.

FIG. 2(*a*) is a detailed circuit diagram showing an example of the soft-start circuit 17 according to the first embodiment of the present invention. When the charge command signal CH is at the LOW level, an inverter $N_s$ outputs HIGH to turn on an NMOS transistor $Q_s$. As a result, the soft-start signal SS is coupled to a ground potential. When the charge command signal CH is at the HIGH level to activate the capacitor charging circuit 10 for the charging process, the inverter $N_s$ outputs LOW to turn off the NMOS transistor $Q_s$. A current source $I_s$ starts charging a capacitor $C_s$, causing the soft-start signal SS to gradually increase from the ground potential until being clamped by forward bias drops of diodes D1 and D2.

FIG. 2(*b*) is a detailed circuit diagram showing an example of the reference voltage generator 14 according to the first embodiment of the present invention. Referring to FIG. 2(*b*), the soft-start signal SS is coupled to a first non-inverting input terminal of a voltage comparator CP. A predetermined reference voltage $V_{r1}$ is coupled to a second non-inverting input terminal of the voltage comparator CP. An output terminal of the voltage comparator CP is coupled to control a gate electrode of an NMOS transistor $Q_{v1}$. A source electrode of the NMOS transistor $Q_{v1}$ is coupled to an inverting input terminal of the voltage comparator CP and a resistor R1. In one embodiment, the reference voltage $V_{r1}$ is set smaller than the stable value of the soft-start signal SS, in which the stable value of the soft-start signal SS is, for example, equal to the forward bias drops of the diodes D1 and D2 as shown in FIG. 2(*a*). PMOS transistors $Q_{v2}$ and $Q_{v3}$ constitute a current mirror for generating the soft-start reference voltage $V_{rs}$. A drain electrode of the transistor $Q_{v2}$ is coupled to a drain electrode of the transistor $Q_{v1}$ while a drain electrode of the transistor $Q_{v3}$ is coupled to a resistor R2. Therefore, when the soft-start signal SS is smaller than the reference voltage $V_{r1}$, the soft-start reference voltage $V_{rs}$ gradually increases along with the increase of the soft-start signal SS. Once the soft-start signal SS becomes larger than the reference voltage $V_{r1}$, the soft-start reference voltage $V_{rs}$ is determined by the reference voltage $V_{r1}$ and therefore remains stable.

In one embodiment of the present invention, the time limiter 18 includes a minimum ON-time limiting unit 18-1, a maximum ON-time limiting unit 18-2, and a minimum OFF-time limiting unit 18-3 for respectively generating the minimum ON-time limiting signal $T_{on}^{min}$, the maximum ON-time limiting signal $T_{on}^{max}$, and the minimum OFF-time limiting signal $T_{off}^{min}$. FIG. 2(*c*) is a detailed circuit diagram showing an example of the minimum ON-time limiting unit 18-1 according to the first embodiment of the present invention. FIG. 2(*d*) is a detailed circuit diagram showing an example of the maximum ON-time limiting unit 18-2 according to the first embodiment of the present invention. FIG. 2(*e*) is a detailed circuit diagram showing an example of the minimum OFF-time limiting unit 18-3 according to the first embodiment of the present invention.

Referring to FIG. 2(*c*), when the switch control signal DRV is at the LOW level to turn off the power switch SW of FIG. 1, an inverter N1 outputs HIGH to turn on an NMOS transistor Q1. As a result, a non-inverting input terminal of a voltage comparator CP1 is coupled to the ground potential, and therefore the voltage comparator CP1 outputs a LOW level of the minimum ON-time limiting signal $T_{on}^{min}$. Once the switch control signal DRV makes a transition from LOW to HIGH to turn on the power switch SW of FIG. 1, the inverter N1 outputs LOW to turn off the NMOS transistor Q1. In this case, a current source 11 is allowed to charge a capacitor C1 such that the voltage at the non-inverting input terminal of the voltage comparator CP1 eventually becomes larger than that at the inverting input terminal of the voltage comparator CP1, and then the HIGH level of the minimum ON-time limiting signal $T_{on}^{min}$ is output. As appreciated from the following detailed description with regard to the switch controller 12, the switch control signal DRV is constrained at the HIGH level for ensuring that the power switch SW remains ON if the minimum ON-time limiting signal $T_{on}^{min}$ is at the LOW level. Therefore, such a time interval from the occurrence of the HIGH level of the switch control signal DRV until the occurrence of the HIGH level of the minimum ON-time limiting signal $T_{on}^{min}$ is referred to as the minimum ON-time of the power switch SW according to the present invention.

It should be noted that the minimum ON-time limiting unit 18-1 according to the present invention may, based on the soft-start signal SS, determine when to generate the HIGH level of the minimum ON-time limiting signal $T_{on}^{min}$, thereby also performing a soft-start modulation on the minimum ON-time. As shown in FIG. 2(*c*), the soft-start signal SS is coupled to a gate electrode of a PMOS transistor Q2 for controlling the supply of a current source I2 to the capacitor C1. When the soft-start signal SS gradually increases from the ground potential to the stable value, the current source I2 gradually reduces the portion supplied to the capacitor C1 because the differential pair constituted by the PMOS transistors Q2 and Q3 distributes the current source I2 between the two current paths in proportion to the ratio of the soft-start signal SS and the reference voltage $V_{r2}$. In other words, during the initial period of the charging process of the capacitor charging circuit 10, the soft-start signal SS is much smaller than the reference voltage $V_{r2}$ such that the current source I2 almost completely flows through the transistor Q2 for charging the capacitor C1. In this case, the terminal voltage across the capacitor C1 increases with a greater rate such that the HIGH level of the minimum ON-time limiting signal $T_{on}^{min}$ occurs much earlier. That is, the minimum ON-time limiting unit 18-1 provides a shorter minimum ON-time. Along with the increase of the soft-start signal SS, the current source 12 reduces the portion supplied to charge the capacitor C1 such that the HIGH level of the minimum ON-time limiting signal $T_{on}^{min}$ occurs later and later. That is, the minimum ON-time limiting unit 18-1 provides a longer minimum ON-time. Therefore, the minimum ON-time provided by the minimum ON-time limiting unit 18-1 is also subjected to the soft-start modulation from shorter to longer.

Referring to FIG. 2(*d*), when the switch control signal DRV is at the LOW level to turn off the power switch SW of FIG. 1, an inverter N2 outputs HIGH to turn on an NMOS transistor Q4. As a result, a non-inverting input terminal of a voltage comparator CP2 is coupled to the ground potential, and therefore the voltage comparator CP2 outputs the LOW level of the maximum ON-time limiting signal $T_{on}^{max}$. Once the switch control signal DRV makes a transition from LOW to HIGH for turning on the power switch SW of FIG. 1, the inverter N2 outputs LOW to turn off the NMOS transistor Q4. In this case, a current source 13 is allowed to charge a capacitor C2 such that the voltage at the non-inverting input terminal of the voltage comparator CP2 eventually becomes larger than that at the inverting input terminal of the voltage comparator CP2, and then the HIGH level of the maximum ON-time limiting signal $T_{on}^{max}$ is output. As appreciated from the following detailed description with regard to the switch controller 12, the HIGH level of the maximum ON-time limiting signal $T_{on}^{max}$ triggers the switch control signal DRV to become LOW for turning off the power switch SW of FIG. 1. Therefore, such a time interval from the occurrence of the HIGH level of the switch control signal DRV until the occurrence of the HIGH level of the maximum ON-time limiting signal $T_{on}^{max}$ is referred to as the maximum ON-time of the power switch SW according to the present invention.

Referring to FIG. 2(*e*), when the switch control signal DRV is at the HIGH level to turn on the power switch SW of FIG. 1, an NMOS transistor Q5 is turned on for coupling a non-inverting input terminal of a voltage comparator CP3 to the ground potential, and therefore the LOW level of the minimum OFF-time limiting signal $T_{off}^{min}$ is output. Once the switch control signal DRV makes a transition from HIGH to LOW for turning off the power switch SW of FIG. 1, the NMOS transistor Q5 is turned off for allowing a current source 14 to charge a capacitor C3. In this case, once the voltage at the non-inverting input terminal is eventually larger than that at the inverting input terminal, the voltage comparator CP3 outputs the HIGH level of the minimum OFF-time limiting signal $T_{off}^{min}$. As appreciated from the following detailed description with regard to the switch controller 12, the switch control signal DRV is constrained at the LOW level for ensuring that the power switch SW remains OFF if the minimum OFF-time limiting signal $T_{off}^{min}$ is at the LOW level. Therefore, such a time interval from the occurrence of the LOW level of the switch control signal DRV until the occurrence of the HIGH level of the minimum OFF-time limiting signal $T_{off}^{min}$ is referred to as the minimum OFF-time of the power switch SW according to the present invention.

FIG. 2(*f*) is a detailed circuit diagram showing an example of the switch controller 12 according to the first embodiment of the present invention. Referring to FIG. 2(*f*), the switch controller 12 is a logical control circuit including two AND logic gates A1 and A2, an OR logic gate O1, and an SR latch LA. The AND logic gate A1 has two input terminals for receiving the ON-time ending signal $V_{on}$ and the minimum ON-time limiting signal $T_{on}^{min}$, respectively. The AND logic gate A2 has two input terminals for receiving the minimum OFF-time limiting signal $T_{off}^{min}$ and the OFF-time ending signal $V_{off}$, respectively. The OR logic gate O1 has two input terminals coupled to the output terminal of the AND logic gate A1 and the maximum ON-time limiting signal $T_{on}^{max}$, respectively. The SR latch LA has a reset input terminal R coupled to the output terminal of the OR logic gate O1, a set input terminal S coupled to the output terminal of the AND logic gate A2, and a non-inverting terminal Q for providing the desired switch control signal DRV.

Figure 3:
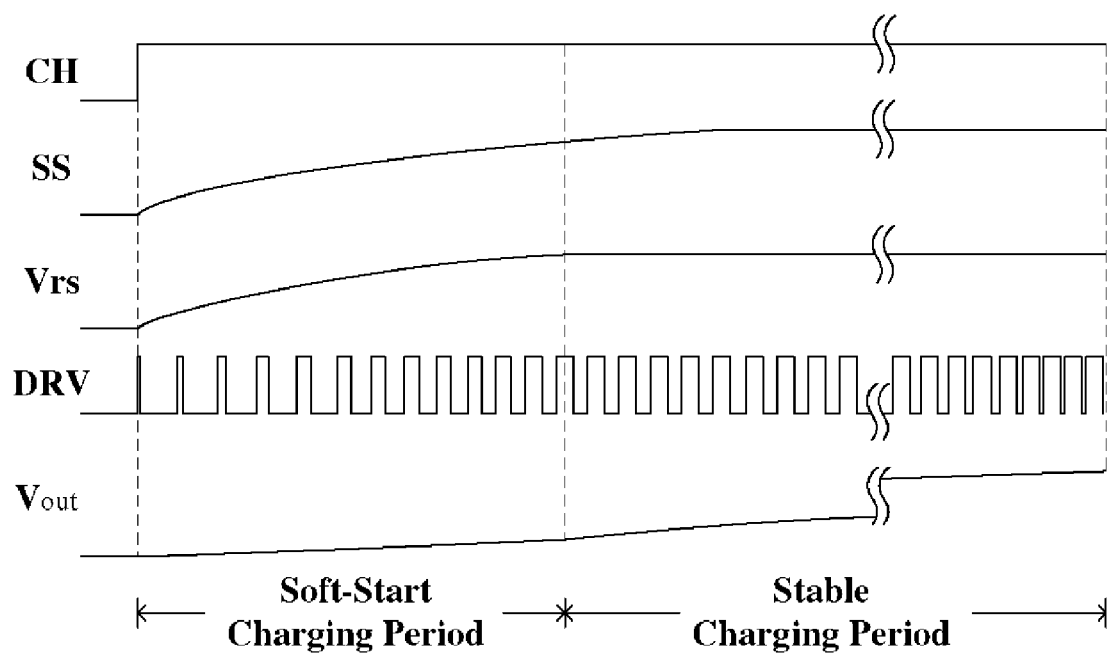
FIG. 3 is a waveform timing chart showing a soft-start characteristic according to the present invention.
Figure 4:
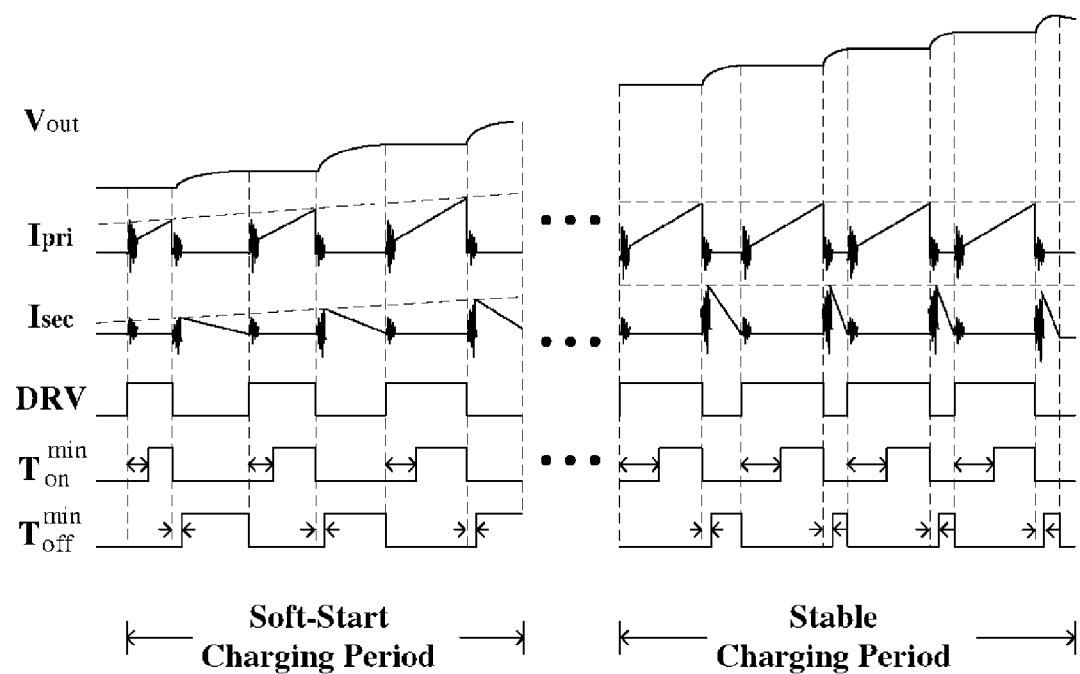
FIG. 4 is a waveform timing chart showing a primary winding current and a secondary winding current according to the present invention.
Figure 5:
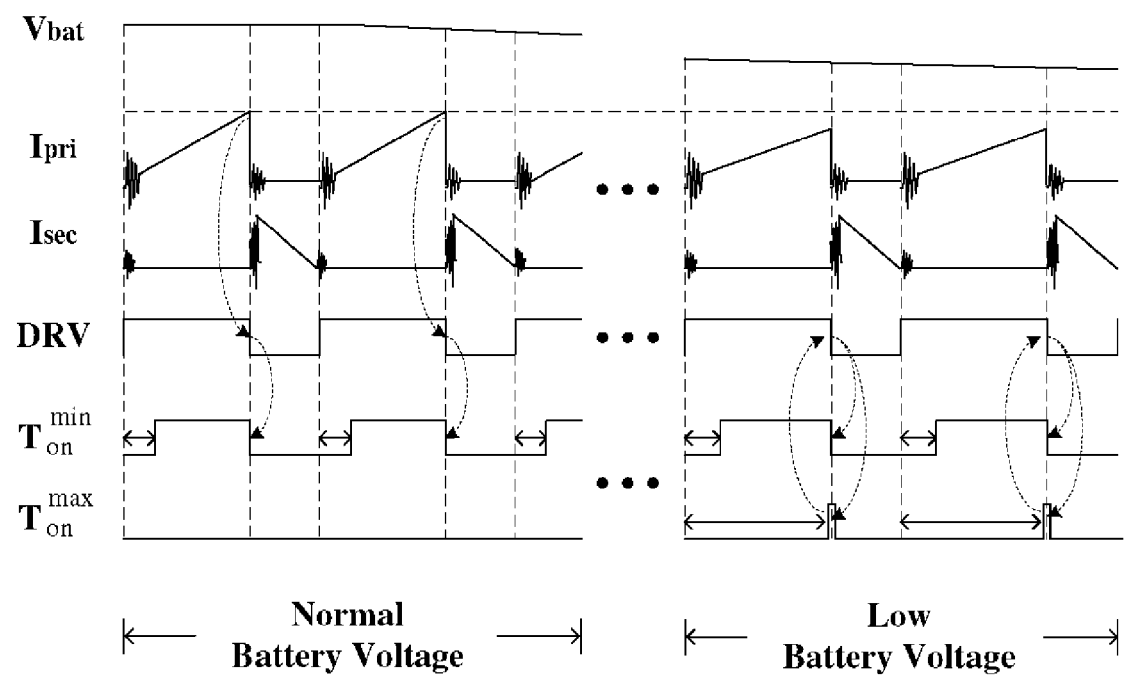
FIG. 5 is a waveform timing chart showing a charging process in response to a drop in a battery voltage according to the present invention.

Hereinafter is described in detail the operations and advantageous effects achieved by the capacitor charging circuit 10 according to the present invention. FIG. 3 is a waveform timing chart showing a soft-start characteristic according to the present invention. FIG. 4 is a waveform timing chart showing the primary winding current $I_{pri}$ and the secondary winding current $I_{sec}$ according to the present invention. FIG. 5 is a waveform timing chart showing the charging process in response to the drop of the battery voltage $V_{bat}$ according to the present invention.

Referring to FIG. 3, the charge command signal CH enters the HIGH level for activating the charging process of the capacitor charging circuit 10. The soft-start signal SS gradually increases from the ground potential to the stable value. The soft-start reference voltage $V_{rs}$ gradually increases along with the soft-start signal SS, and reaches the stable value earlier than the soft-start signal SS. The stable value of the soft-start reference voltage $V_{rs}$ may be set smaller than the stable value of the soft-start signal SS. The charging period before the soft-start reference voltage $V_{rs}$ reaches the stable value is referred to as a soft-start charging period, and the charging period after the soft-start reference voltage $V_{rs}$ reaches the stable value is referred to as a stable charging period. During the soft-start charging period, the HIGH-time of the switch control signal DRV each charging cycle, corresponding to the ON-time of the power switch SW, gradually prolongs along with the increase of the soft-start reference voltage $V_{rs}$. During the stable charging period, the HIGH-time of the switch control signal DRV each charging cycle remains constant because the soft-start reference voltage $V_{rs}$ has already been stable. Since the ON-time of the power switch SW has such a soft-start modulation characteristic, the capacitor charging circuit 10 according to the present invention effectively prevents the large inrush current from flowing into the primary winding L1 of the transformer 11 during the initial period of the charging process. As a result, a smaller amount of energy is to be stored in the transformer 11 each charging cycle, saving the time necessary for delivering the energy to the capacitive load $C_{load}$ even when the terminal voltage $V_{out}$ across the capacitive load $C_{load}$ is almost zero. Therefore, the capacitor charging circuit 10 according to the present invention effectively enhances the charging efficiency during the initial period of the charging process.

Referring to FIG. 4, during the HIGH level of the switch control signal DRV every charging cycle, the primary winding current $I_{pri}$ continuously increases due to the energy delivery from the battery voltage $V_{bat}$ to the transformer 11 while the secondary winding current $I_{sec}$ is terminated to zero. During the LOW level of the switch control signal DRV every charging cycle, the secondary winding current $I_{sec}$ continuously decreases due to the energy delivery from the transformer 11 to the capacitive load $C_{load}$ while the primary winding current $I_{pri}$ is terminated to zero. Each time when the switch control signal DRV makes HIGH-to-LOW or LOW-to-HIGH transitions, i.e. the power switch SW performs the ON/OFF switching operations, the primary and secondary winding currents $I_{pri}$ and $I_{sec}$ inevitably fluctuate up and down with a great ratio to their DC values.

In order to avoid erroneous switching caused by such fluctuant noise, the capacitor charging circuit 10 is provided with the minimum ON-time limiting signal $T_{on}^{min}$ and the minimum OFF-time limiting signal $T_{off}^{min}$. As clearly seen from FIG. 4, the fluctuant noise associated with the LOW-to-HIGH transition of the switch control signal DRV completely occurs within a period when the minimum ON-time limiting signal $T_{on}^{min}$ still remains LOW. In this case, the AND logic gate A1 of FIG. 2(*f*) always outputs LOW regardless of the ON-time ending signal $V_{on}$, thereby effectively preventing the fluctuant noise from erroneously triggering the switch control signal DRV. Furthermore, the fluctuant noise associated with the HIGH-to-LOW transition of the switch control signal DRV completely occurs within a period when the minimum OFF-time limiting signal $T_{off}^{min}$ still remains LOW. In this case, the AND logic gate A2 of FIG. 2(*f*) always outputs LOW regardless of the OFF-time ending signal $V_{off}$, thereby effectively preventing the fluctuant noise from erroneously triggering the switch control signal DRV.

Incidentally, during the soft-start charging period, the maximum value of the primary winding current $I_{pri}$ each charging cycle gradually increases because of the increase of the soft-start reference voltage $V_{rs}$. However, during the stable charging period, the maximum value of the primary winding current $I_{pri}$ each charging cycle remains constant due to the stable value of the soft-start reference voltage $V_{rs}$.

Referring to FIG. 5, in the case that the battery voltage $V_{bat}$ is normal or high enough, the primary winding current $I_{pri}$ increases with a normal rate during the HIGH level of the switch control signal DRV. When the primary winding current $I_{pri}$ reaches the upper limit determined by the soft-start reference voltage $V_{rs}$, the ON-time ending signal $V_{on}$ through the switch controller 12 triggers the switch control signal DRV to become LOW, as described above. After continuously supplying energy for a long time, the battery voltage $V_{bat}$ may be subjected to a significant drop. In the case that the battery voltage $V_{bat}$ is too low, the primary winding current $I_{pri}$ increases with a much slower rate during the HIGH level of the switch control signal DRV. Consequently, each charging cycle is prolonged, causing the larger output ripples and lower charging efficiency.

As a countermeasure, the capacitor charging circuit 10 is provided with the maximum ON-time limiting signal $T_{on}^{max}$. When the switch control signal DRV has already stayed HIGH for a predetermined maximum ON-time, the maximum ON-time limiting signal $T_{on}^{max}$ through the switch controller 12 triggers the switch control signal DRV to become LOW even if the primary winding current $I_{pri}$ is still smaller than the upper limit. Therefore, the capacitor charging circuit 10 according to the present invention effectively prevents the charging process from being deteriorated by the drop of the battery voltage $V_{bat}$.

Figure 6:
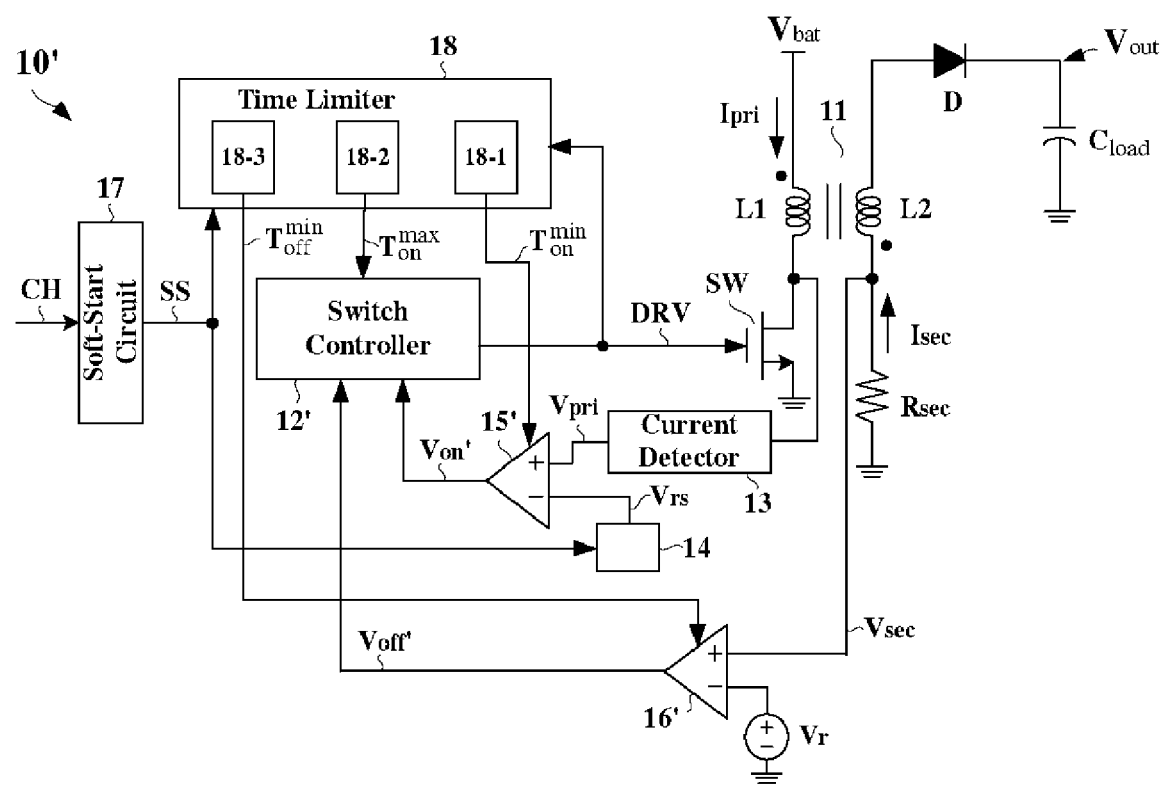
FIG. 6 is a circuit block diagram showing a capacitor charging circuit according to a second embodiment of the present invention.

FIG. 6 is a circuit block diagram showing a capacitor charging circuit 10' according to a second embodiment of the present invention. The capacitor charging circuit 10' of the second embodiment shown in FIG. 6 is different from the capacitor charging circuit 10 of the first embodiment shown in FIG. 1 in that: (1) the minimum ON-time limiting unit 18-1 outputs the minimum ON-time limiting signal $T_{on}^{min}$ to a voltage comparator 15' for preventing an ON-time ending signal $V_{on}'$ from becoming LOW before the minimum ON-time expires; (2) the minimum OFF-time limiting unit 18-3 outputs the minimum OFF-time limiting signal $T_{off}^{min}$ to a voltage comparator 16' for preventing an OFF-time ending signal $V_{off}'$ from becoming LOW before the minimum OFF-time expires; and (3) a switch controller 12' generates the switch control signal DRV in response to the ON-time ending signal $V_{on}'$, the OFF-time ending signal $V_{off}'$, and the maximum ON-time limiting signal $T_{on}^{max}$.

Figure 7A:
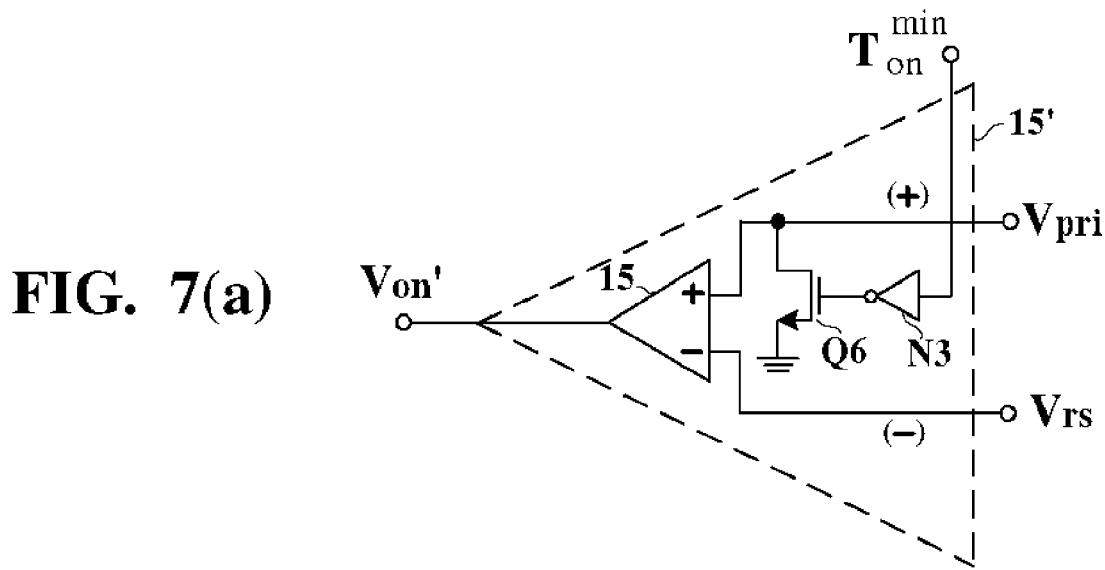
FIG. 7(a) is a detailed circuit diagram showing an example of a first voltage comparator according to a second embodiment of the present invention.

FIG. 7(a) is a detailed circuit diagram showing an example of the voltage comparator 15' according to the second embodiment of the present invention. Referring to FIG. 7(a), the voltage comparator 15' is formed by a switch transistor Q6 and an inverter N3 coupled to the non-inverting input terminal of the voltage comparator 15 of FIG. 1. When the minimum ON-time limiting signal $T_{on}^{min}$ is at the LOW level, the inverter N3 outputs HIGH to turn on the switch transistor Q6. As a result, the non-inverting input terminal of the voltage comparator 15 is coupled to the ground potential. In this case, the ON-time ending signal $V_{on}$ is constrained at the LOW level for effectively avoiding the influence of the fluctuant noise. When the HIGH level of the minimum ON-time limiting signal $T_{on}^{min}$ occurs, i.e. the minimum ON-time expires, the inverter N3 outputs LOW and stops turning on the switch transistor Q6. As a result, the non-inverting input terminal of the voltage comparator 15 returns to normally receive the primary current detection signal $V_{pri}$ so as to perform the comparison function described in the first embodiment.

Figure 7B:
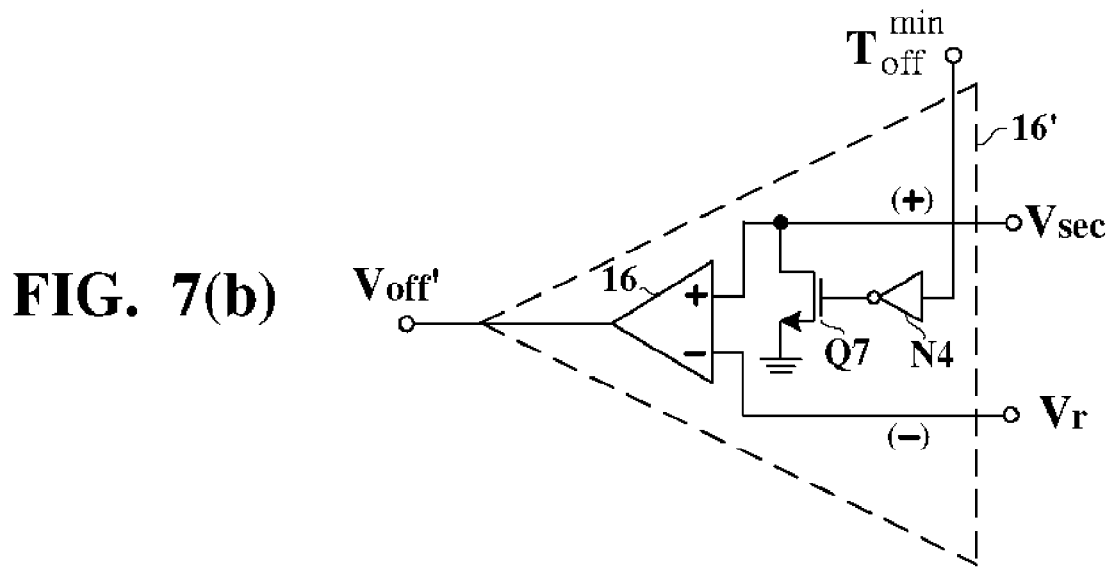
FIG. 7(b) is a detailed circuit diagram showing an example of a second voltage comparator according to a second embodiment of the present invention.

FIG. 7(b) is a detailed circuit diagram showing an example of the voltage comparator 16' according to the second embodiment of the present invention. Referring to FIG. 7(b), the voltage comparator 16' is formed by a switch transistor Q7 and an inverter N4 coupled to the non-inverting input terminal of the voltage comparator 16 of FIG. 1. When the minimum OFF-time limiting signal $T_{off}^{min}$ off is at the LOW level, the inverter N4 outputs HIGH to turn on the switch transistor Q7. As a result, the non-inverting input terminal of the voltage comparator 16 is coupled to the ground potential. In this case, the OFF-time ending signal $V_{off}$ is constrained at the LOW level for effectively avoiding the influence of the fluctuant noise. When the HIGH level of the minimum OFF-time limiting signal $T_{off}^{min}$ occurs, i.e. the minimum OFF-time expires, the inverter N4 outputs LOW and stops turning on the switch transistor Q7. As a result, the non-inverting input terminal of the voltage comparator 16 returns to normally receive the secondary current detection signal $V_{sec}$ so as to perform the comparison function described in the first embodiment.

Figure 7C:
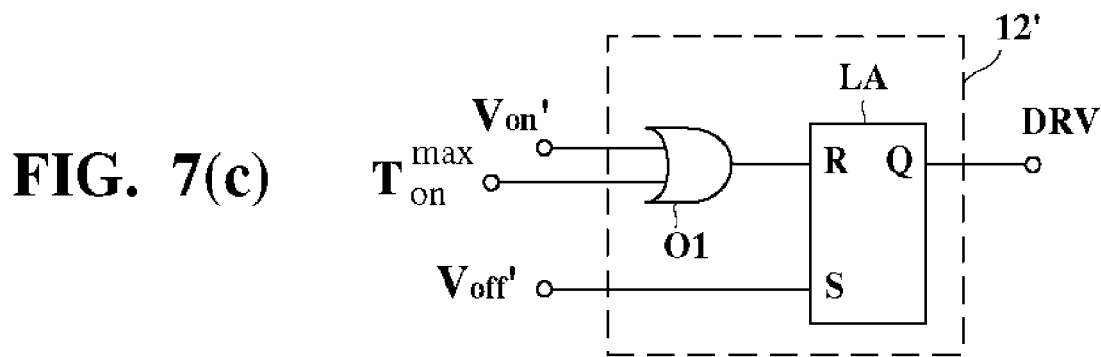
FIG. 7(c) is a detailed circuit diagram showing an example of a switch controller according to a second embodiment of the present invention.

FIG. 7(c) is a detailed circuit diagram showing an example of the switch controller 12' according to the second embodiment of the present invention. As described above, since the ON-time ending signal $V_{on}'$ is constrained at the LOW level before the minimum ON-time expires, the ON-time ending signal $V_{on}'$ is equivalent in logic to the output signal of the AND logic gate A1 of FIG. 2(f). Likely, since the OFF-time ending signal $V_{off}'$ is constrained at the LOW level before the minimum OFF-time expires, the OFF-time ending signal $V_{off}'$ is equivalent in logic to the output signal of the AND logic gate A2 of FIG. 2(f). Therefore, in the switch controller 12' of FIG. 7(c), the OR logic gate O1 has two input terminals coupled to the ON-time ending signal $V_{on}'$ and the maximum ON-time limiting signal $T_{on}^{max}$, respectively. The SR latch LA has the reset input terminal R coupled to the output terminal of the OR logic gate O1, the set input terminal S coupled to the OFF-time ending signal $V_{off}'$, and the non-inverting output terminal Q for providing the desired switch control signal DRV.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

The invention claimed is:

1. A capacitor charging circuit for controlling a transformer such that a voltage source coupled to a primary winding of the transformer charges a capacitive load coupled to a secondary winding of the transformer, comprising:
   a power switch coupled to the primary winding such that a primary winding current is allowed to flow during an ON-time of the power switch but is terminated during an OFF-time of the power switch;
   a switch controller for controlling the ON-time and the OFF-time;
   a soft-start circuit for modulating the ON-time to gradually increase during an initial period of a charging process;
   a first current detector for detecting the primary winding current to generate a primary current detection signal;
   a reference voltage generator controlled by the soft-start circuit to generate a soft-start reference voltage; and a first voltage comparator for comparing the primary current detection signal with the soft-start reference voltage so as to output an ON-time ending signal to the switch controller.

2. The capacitor charging circuit according to claim 1, further comprising:
a second current detector for detecting a secondary winding current to generate a secondary current detection signal; and
a second voltage comparator for comparing the secondary current detection signal with a predetermined reference voltage so as to output an OFF-time ending signal to the switch controller.

3. The capacitor charging circuit according to claim 1, further comprising:
a minimum ON-time limiting unit for preventing the power switch from being turned off before a minimum ON-time expires.

4. The capacitor charging circuit according to claim 3, wherein:
the minimum ON-time limiting unit outputs a minimum ON-time limiting signal to the switch controller for determining the minimum ON-time.

5. The capacitor charging circuit according to claim 3, wherein:
the minimum ON-time limiting unit is controlled by the soft-start circuit for modulating the minimum ON-time to gradually increase during the initial period of the charging process.

6. The capacitor charging circuit according to claim 1, wherein:
a minimum OFF-time limiting unit for preventing the power switch from being turned on before a minimum OFF-time expires.

7. The capacitor charging circuit according to claim 6, wherein:
the minimum OFF-time limiting unit outputs a minimum OFF-time limiting signal to the switch controller for determining the minimum OFF-time.

8. The capacitor charging circuit according to claim 1, further comprising:
a maximum ON-time limiting unit for preventing the power switch from still remaining ON after a maximum ON-time expires.

9. The capacitor charging circuit according to claim 8, wherein:
the maximum ON-time limiting unit outputs a maximum ON-time limiting signal to the switch controller for determining the maximum ON-time.

10. A capacitor charging circuit for controlling a transformer such that a voltage source coupled to a primary winding of the transformer charges a capacitive load coupled to a secondary winding of the transformer, comprising:
a power switch coupled to the primary winding such that a primary winding current is allowed to flow during an ON-time of the power switch but is terminated during an OFF-time of the power switch;
a switch controller for controlling the ON-time and the OFF-time;
a minimum ON-time limiting unit for preventing the power switch from being turned off before a minimum ON-time expires;
a first current detector for detecting the primary winding current to generate a primary current detection signal;
a reference voltage generator for generating a soft-start reference voltage; and
a first voltage comparator for comparing the primary current detection signal with the soft-start reference voltage so as to output an ON-time ending signal to the switch controller.

11. The capacitor charging circuit according to claim 10, wherein:
the minimum ON-time limiting unit outputs a minimum ON-time limiting signal to the first voltage comparator for determining the minimum ON-time.

12. The capacitor charging circuit according to claim 10, further comprising:
a second current detector for detecting a secondary winding current to generate a secondary current detection signal; and
a second voltage comparator for comparing the secondary current detection signal with a predetermined reference voltage so as to output an OFF-time ending signal to the switch controller.

13. A capacitor charging circuit for controlling a transformer such that a voltage source coupled to a primary winding of the transformer charges a capacitive load coupled to a secondary winding of the transformer, comprising:
a power switch coupled to the primary winding such that a primary winding current is allowed to flow during an ON-time of the power switch but is terminated during an OFF-time of the power switch;
a switch controller for controlling the ON-time and the OFF-time;
a minimum OFF-time limiting unit for preventing the power switch from being turned on before a minimum OFF-time expires;
a first current detector for detecting the primary winding current to generate a primary current detection signal;
a reference voltage generator for generating a soft-start reference voltage; and
a first voltage comparator for comparing the primary current detection signal with the soft-start reference voltage so as to output an ON-time ending signal to the switch controller.

14. The capacitor charging circuit according to claim 13, wherein:
a second current detector for detecting a secondary winding current to generate a secondary current detection signal; and
a second voltage comparator for comparing the secondary current detection signal with a predetermined reference voltage so as to output an OFF-time ending signal to the switch controller.

15. The capacitor charging circuit according to claim 14, wherein:
the minimum OFF-time limiting unit outputs a minimum OFF-time limiting signal to the second voltage comparator for determining the minimum OFF-time.

16. A capacitor charging circuit for controlling a transformer such that a voltage source coupled to a primary winding of the transformer charges a capacitive load coupled to a secondary winding of the transformer, comprising:
a power switch coupled to the primary winding such that a primary winding current is allowed to flow during an ON-time of the power switch but is terminated during an OFF-time of the power switch;
a switch controller for controlling the ON-time and the OFF-time;

a maximum ON-time limiting unit for preventing the power switch from still remaining ON after a maximum ON-time expires;
a first current detector for detecting the primary winding current to generate a primary current detection signal;
a reference voltage generator for generating a soft-start reference voltage; and
a first voltage comparator for comparing the primary current detection signal with the soft-start reference voltage so as to output an ON-time ending signal to the switch controller.

17. The capacitor charging circuit according to claim 16, further comprising:
a second current detector for detecting a secondary winding current to generate a secondary current detection signal; and
a second voltage comparator for comparing the secondary current detection signal with a predetermined reference voltage so as to output an OFF-time ending signal to the switch controller.

* * * * *